United States Patent
Kawabata et al.

(10) Patent No.: US 6,424,645 B1
(45) Date of Patent: Jul. 23, 2002

(54) TDMA RADIO COMMUNICATION SYSTEM ACHIEVING SIMULTANEOUS ASSIGNMENT OF CHANNELS TO MULTIPLE TERMINAL STATIONS

(75) Inventors: Takashi Kawabata; Youichi Moritani; Tomokazu Hamada; Tohru Sogabe, all of Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/301,565

(22) Filed: Apr. 29, 1999

(30) Foreign Application Priority Data

Sep. 9, 1998 (JP) ............................. 10-254809

(51) Int. Cl.$^7$ ............................................. H04B 7/212
(52) U.S. Cl. ...................... 370/347; 370/322; 370/422; 370/468; 370/512; 375/285; 375/365
(58) Field of Search ................................ 370/330, 335, 370/343, 347, 422, 468, 509, 512, 322; 375/285, 365, 366; 455/69, 535, 450, 453, 507, 509

(56) References Cited

U.S. PATENT DOCUMENTS

| | | | | |
|---|---|---|---|---|
| 4,322,845 A | * | 3/1982 | Fennel, Jr. et al. ......... | 370/321 |
| 5,313,461 A | * | 5/1994 | Ahl et al. .................... | 370/349 |
| 5,436,906 A | * | 7/1995 | Kasuya et al. .............. | 370/347 |
| 5,506,837 A | * | 4/1996 | Sollner et al. .............. | 370/296 |
| 5,559,795 A | * | 9/1996 | Ahl ............................ | 370/342 |
| 5,559,805 A | * | 9/1996 | Hedderly .................... | 370/443 |
| 5,699,356 A | * | 12/1997 | Beever et al. .............. | 370/329 |
| 5,818,823 A | * | 10/1998 | Nakanishi ................... | 370/322 |
| 5,982,761 A | * | 11/1999 | Dutta ......................... | 370/337 |
| 6,031,827 A | * | 2/2000 | Rikkinen et al. ........... | 370/330 |

FOREIGN PATENT DOCUMENTS

| | | |
|---|---|---|
| JP | 9-18435 | 1/1997 |
| JP | 10-51406 | 2/1998 |

* cited by examiner

Primary Examiner—Huy D. Vu
Assistant Examiner—M. Phan

(57) ABSTRACT

A TDMA radio communication method including the steps of: providing a latter part of each of super frames with an assignment information notification period which is preceded by an assignment processing period, and providing a remaining part of the each of the super frame with an assignment request collecting period; transmitting, from a terminal station to a base station, assignment request information using a plurality of frames included in the assignment request collecting period; transmitting, from the base station to the terminal station, frame structure information and assignment information over a plurality of frames included in the assignment information notification period; and carrying out, in the base station, channel assignment of a radio channel, changes of the frame structure and of the channel assignment in response to timings of the super frames. This makes it possible to solve a problem involved in a conventional TDMA radio communication system in that it is difficult for the base station to achieve reassignment of channels to a plurality of terminal stations at the same time with considering the entire terminal stations connected to the base station because the conventional system carries out channel assignment, changes of the assignment and reassignment individually to the terminal stations.

10 Claims, 12 Drawing Sheets

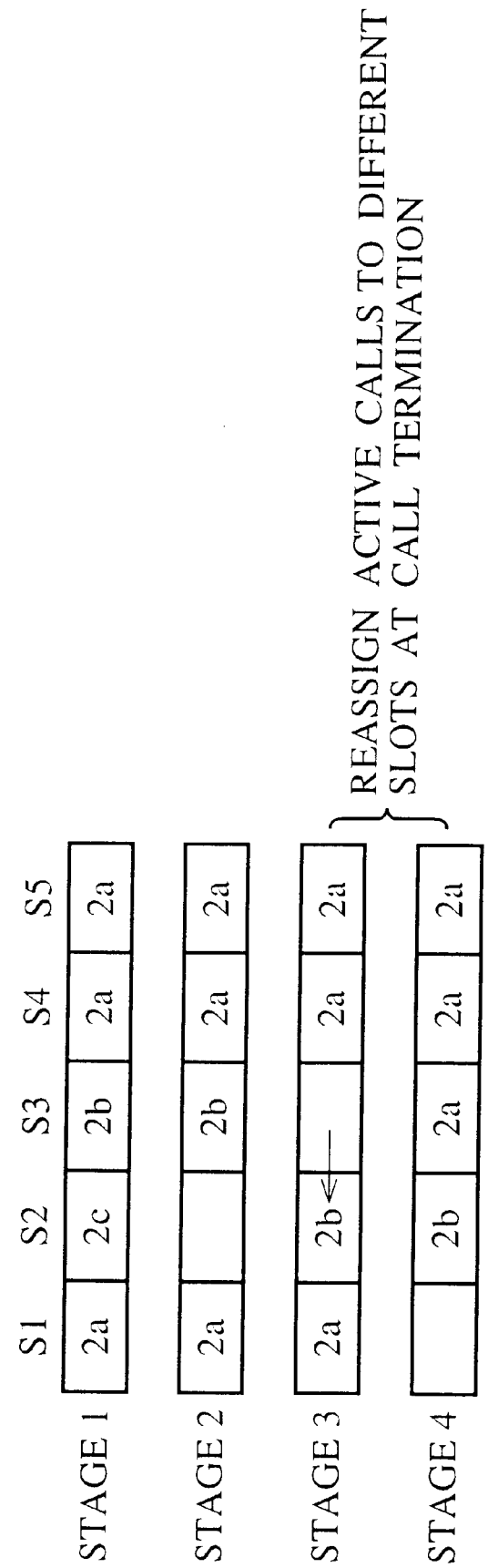

TDMA RADIO COMMUNICATION SYSTEM ACHIEVING SIMULTANEOUS ASSIGNMENT OF CHANNELS TO MULTIPLE TERMINAL STATIONS

BACKGROUND OF THE INVENTION

1. Field of the Invention

The present invention relates to assignment of a time division multiplexed radio channel, and particularly to a radio communication method capable of changing the frame structure that is specified by a boundary between downward and upward TDMA channels, or by the boundary information between multiple access protocols of a random access channel and a DA-TDMA channel.

2. Description of Related Art

Conventionally, DA-TDMA (Demand Assignment-Time Division Multiple Access) is known as one of multiple access methods which establish channels as needed in channel resources shared by a base station and multiple terminal stations, as disclosed in Chapter 6.2 of Yamamoto and Kato, "TDMA COMMUNICATIONS", published by the institute of electronics, information and communication engineers of Japan, for example. The DA-TDMA, which assigns channels in response to demands of the terminal stations, can make effective use of the channels having traffic fluctuations. As a transmission method, a variety of multiple access schemes are used such as a random access method allowing collision, and a collision avoidance method employing assigned channels.

FIG. 7 shows the entire configuration of a TDMA communication system. A base station 3 is connected with terminal stations 2 (2a, 2b and 2c) via radio channels. Terminal units 1 (1a, 1b and 1c) are connected to the corresponding terminal stations 2. The base station 3 manages the channel resources between it and the terminal stations 2 connected thereto, and establishes channels between them in response to channel establishment requests from the terminal stations 2. The channel resources are time-divided, and the channel establishment is carried out at a TDMA frame period consisting of a plurality of time slots.

FIG. 8 shows a TDMA frame structure disclosed in Japanese patent application laid-open No. 9-18435/1997, for example. Various types of channels are assigned to a plurality of time slots constituting a TDMA frame. Upward control channels are used when the terminal stations 2 make a request for channel establishment or release to the base station 3, and downward control channels are used when the base station 3 issues a command to perform channel establishment or release to the terminal stations 2. Downward and upward traffic channels are assigned to the terminal stations as needed, and are used for the data communications between the base station 3 and terminal stations 2. The present example employs in the downward channels the TDM (Time Division Multiplex), and in the upward control channels the DA-TDMA using the slotted ALOHA (Additive Links On-line Hawaii Area). The upward traffic channels can be divided into subframes associated with services such as ABR (Available Bit Rate), VBR (Variable Bit Rate) and CBR (Constant Bit Rate). In addition, it will be able to vary, in accordance with traffic, boundaries such as a boundary between the upward channel and downward channel, or between the control channel and traffic channel, and a boundary between the multiple access protocols such as S-ALOHA and DA-TDMA, or between subframes corresponding to various services.

FIG. 9 is a sequence diagram illustrating channel assignment disclosed in Japanese patent application laid-open No. 9-214459/1997, for example. Horizontal axes are a time axis, and the processings are carried out sequentially from the left-hand side. Blocks at the top of this figure represent TDMA frames, on the basis of which the processings are carried out. When the data to be transmitted takes place in FIG. 9, the terminal station 2 transmits assignment request information to the base station 3. Receiving the request, the base station 3 assigns the requested number of slots from among the available slots in a TDMA frame, and sends to the terminal station 2 channel assignment information obtained as a result of the assignment. The terminal station 2 begins data communications in accordance with the instructions.

FIG. 10 shows a TDMA frame structure disclosed in Japanese patent application laid-open No. 10-51406/1998, for example. In this example, upward control channels, which are used for requesting the channel establishment or release from the terminal station 2 to the base station 3, precede the downward control channels, which are used for requesting the channel establishment or release from the base station 3 to the terminal station 2. Downward and upward traffic channels are allotted between the upward and downward control channels.

FIG. 11 is a sequence diagram illustrating channel assignment, in which the horizontal axes are a time axis, and the processings are carried out sequentially from the left-hand side. Blocks at the top of this figure represent TDMA frames, on the basis of which the processings are carried out. When the data to be transmitted takes place in FIG. 11, the terminal station 2a transmits assignment request information to the base station 3. Receiving the request, the base station 3 assigns the requested number of slots from among the available slots in a TDMA frame at a downward/upward traffic channel period, and sends to the terminal station 2 channel assignment information obtained as a result of the assignment through the downward control channel of the same frame. The terminal station 2 begins data communications from the next frame in accordance with the instructions.

Finally, FIG. 12 shows a method for assigning a plurality of slots disclosed in Japanese patent application laid-open No. 8-265836/1996, for example. FIG. 12 illustrates only a single frame on a upward traffic channel, in which the frame consists of five slots designated by S1–S5. At stage 1, the slots S1, S4 and S5 are assigned to the terminal station 2a, the slot S3 is assigned to the terminal station 2b and the slot S2 is assigned to the terminal station 2c. Discontinuous slots thus assigned will result in divided transmission bursts. Generally, since an overhead like guard time or an alignment symbol is required for each transmission burst, assigning continuous slots is preferable to improve the efficiency. Stage 2 illustrates a state in which the terminal station 2c completes its call. At stage S3, the slot S2, which becomes available owing to the call completion, is reassigned to the terminal station 2b instead of the slot S3. At stage 4, continuous slots S3, S4 and S5 are reassigned to the terminal station 2a. Thus, the conventional reassignment is achieved by independently changing the assignment of the slots to the individual terminal stations 2 in accordance with the timings of originating or terminating a call.

As described above, the conventional TDMA radio communication systems achieve the channel assignment by assigning a channel to each terminal station 2, by changing the assignment and by reassigning a channel. Therefore, it is very difficult for them to consider the entire terminal stations 2 belonging to the base station 3 to carry out the channel assignment or reassignment at the same time. Thus, it is difficult for them to implement optimum channel assignment considering characteristics of the entire terminal stations and the channel assignment requests. In particular, it is not unlikely that the entire channel assignment of all the terminal stations 2 must be changed to vary in accordance with the traffic the boundary such as the boundary between the upward channel and downward channel, between the control channel and traffic channel, between the multiple access protocols, or between subframes corresponding to various services. Accordingly, it is necessary to design a TDMA radio communication system capable of changing the channel assignment of all the terminal stations 2 at the same time.

The simultaneous change of the channel assignment to all the terminal stations 2 is difficult in the conventional TDMA radio communication system because it is not rare that only insufficient reliability can be obtained of the upward and downward control channels. It is necessary for the radio communications to consider the possibility that errors will take place on the control channels because of fluctuations in communication quality due to fading or shadowing. As for the individual change of the assignment to each terminal station 2, it has no effect on the remaining terminal stations even if the reliability of the control channel is insufficient, although the channel assignment to that terminal station 2 is impossible. In addition, using a retransmission means such as ARQ (automatic request for repetition) will complete the channel assignment with some delay. In contrast, in the simultaneous change of the channel assignment to all the terminal stations, a transmission error on the control channel can cause collision between the transmission signals from the normally operating terminal station 2, to which the current slot is assigned rightly, and from the terminal station 2 which carries out erroneous transmission, thereby resulting in transmission error of the traffic channels. Therefore, it is necessary to design a TDMA radio communication system that can achieve transmission with maintaining channel assignment information and changing timing for all the terminal stations 2 with sufficient reliability until the changing timing has passed.

The reliability of the control channel can be improved by introducing error correcting code or by some error control technique like retransmission of the same information. However, improving the reliability of the control channel by retransmission will take extra time for the transmission on the control channel, resulting in delay in call connections. It is preferable that the delay of connections is as small as possible because it causes degradation of the service and an increase of the buffer capacity of communication data. Accordingly, it is necessary to design a TDMA radio communication system capable of reducing the channel assignment time as small as possible so far as this does not affect the remaining communications.

SUMMARY OF THE INVENTION

The present invention is implemented to solve the foregoing problem. It is therefore an object of the present invention to provide a TDMA radio communication method capable of achieving the simultaneous channel assignment to all the terminal stations connected to a base station with small delay and high reliability.

According to a first aspect of the present invention, there is provided a TDMA radio communication method which has super frames each consisting of a plurality of frames, and which includes in the frame a control channel for exchanging control information between a base station and at least one terminal station, the TDMA radio communication method comprising the steps of: providing a latter part of each of the super frames with an assignment information notification period which is preceded by an assignment processing period, and providing a remaining part of the each of the super frame with an assignment request collecting period; transmitting, from the terminal station to the base station, assignment request information using a plurality of frames included in the assignment request collecting period; transmitting, from the base station to the terminal station, frame structure information and assignment information over a plurality of frames included in the assignment information notification period; and carrying out, in the base station, channel assignment of a radio channel, changes of the frame structure and of the channel assignment in response to timings of the super frames.

According to a second aspect of the present invention, there is provided a TDMA radio communication method which has super frames each consisting of a plurality of frames, and which includes in the frame a control channel for exchanging control information between a base station and at least one terminal station, the TDMA radio communication method comprising the steps of: providing a latter part of each of the super frames with an assignment information notification period which is preceded by an assignment processing period, and providing a remaining part of the each of the super frame with an assignment request collecting period; transmitting, from the terminal station to the base station, assignment request information; carrying out, in the base station, channel assignment from among available slots in a current super frame in response to the assignment request information received by the base station during the assignment request collecting period, and transmitting information on the channel assignment to the terminal station; carrying out, in the base station, channel assignment from among available slots in both the current super frame and next super frame in response to the assignment request information received by the base station during one of the assignment processing period and the assignment information notification period, and transmitting information on the channel assignment to the terminal station; transmitting, from the base station to the terminal station, frame structure information and assignment information over a plurality of frames included in the assignment information notification period; and carrying out, in the base station, changes of the frame structure and of the channel assignment in response to timings of the super frames.

Here, the TDMA radio communication method may further comprise the step of transmitting the assignment request information and the assignment information a plurality of times to make a majority decision at a receiving side.

The frame structure information may comprise information on a super frame length and a frame length, and one of two pieces of boundary information consisting of boundary information between an upward channel and a downward channel, and boundary information between protocols of multiple access channels such as a random access channel and a TDMA channel, and the TDMA radio communication method may further comprise the step of carrying out optimum channel assignment using the frame structure information.

The TDMA radio communication method may further comprise the step of changing the channel assignment to enable the terminal station, to which discontinuous slots are assigned in a current super frame, to use consecutive slots in a next super frame.

The TDMA radio communication method may further comprise the step of inhibiting transmission of a next super frame from the terminal station which cannot receive the assignment information during the assignment information notification period, until the terminal station receives the channel assignment information.

BRIEF DESCRIPTION OF THE DRAWINGS

FIG. 12 is a diagram showing a method for assigning a plurality of slots disclosed in Japanese patent application laid-open No. 8-265836.

DETAILED DESCRIPTION OF THE PREFERRED EMBODIMENTS

The invention will now be described with reference to the accompanying drawings.

Embodiment 1

Figure 7:
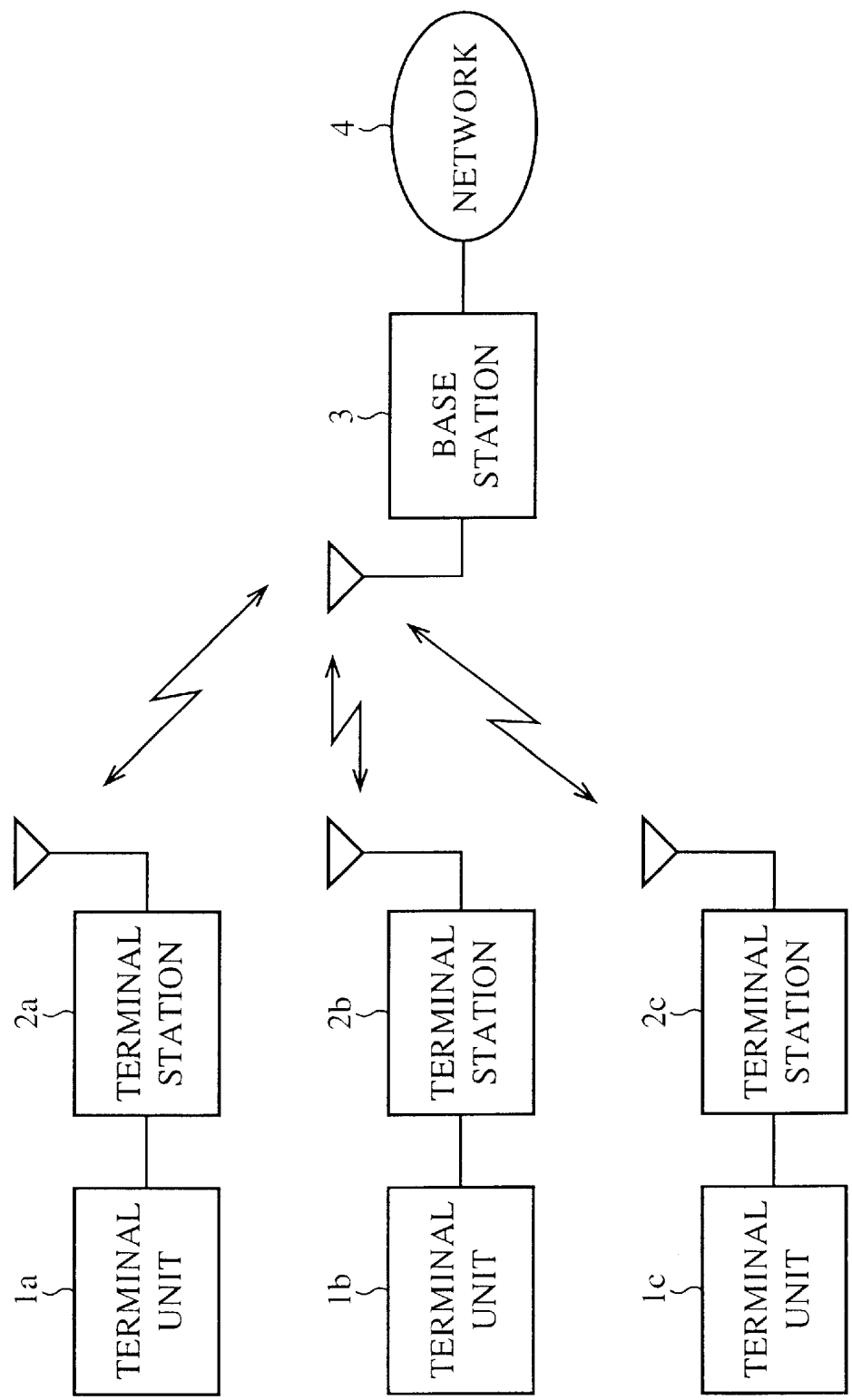
FIG. 7 is a block diagram showing an entire configuration of a TDMA radio communication system.
Figure 8:
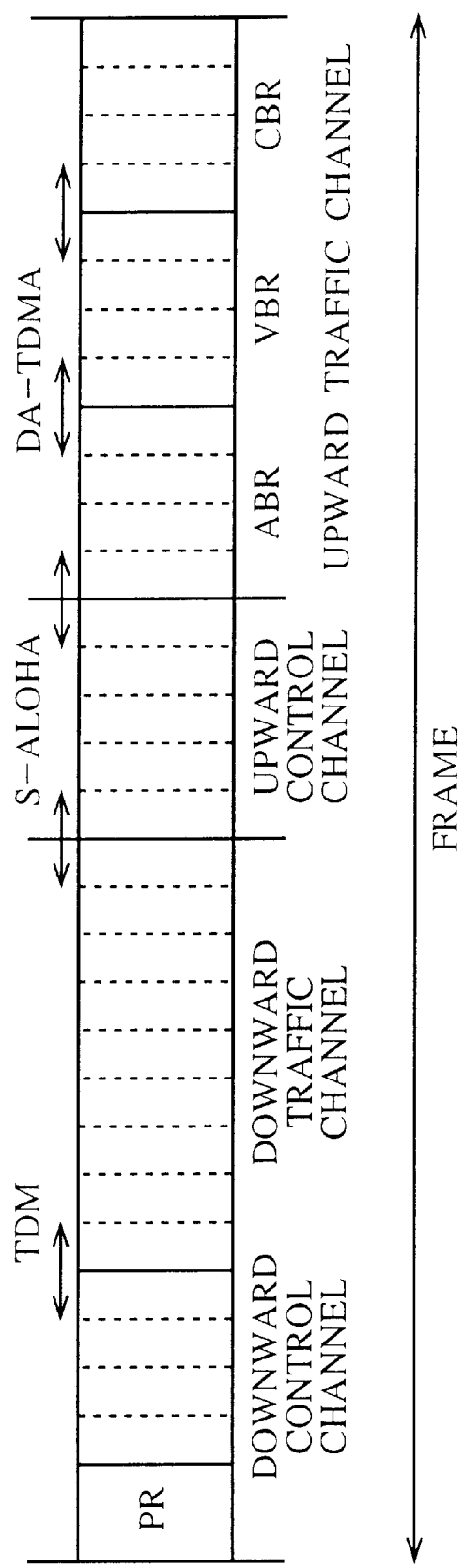
FIG. 8 is a diagram showing the structure of a TDMA frame disclosed in Japanese patent application laid-open No. 9-18435/1997.
Figure 9:
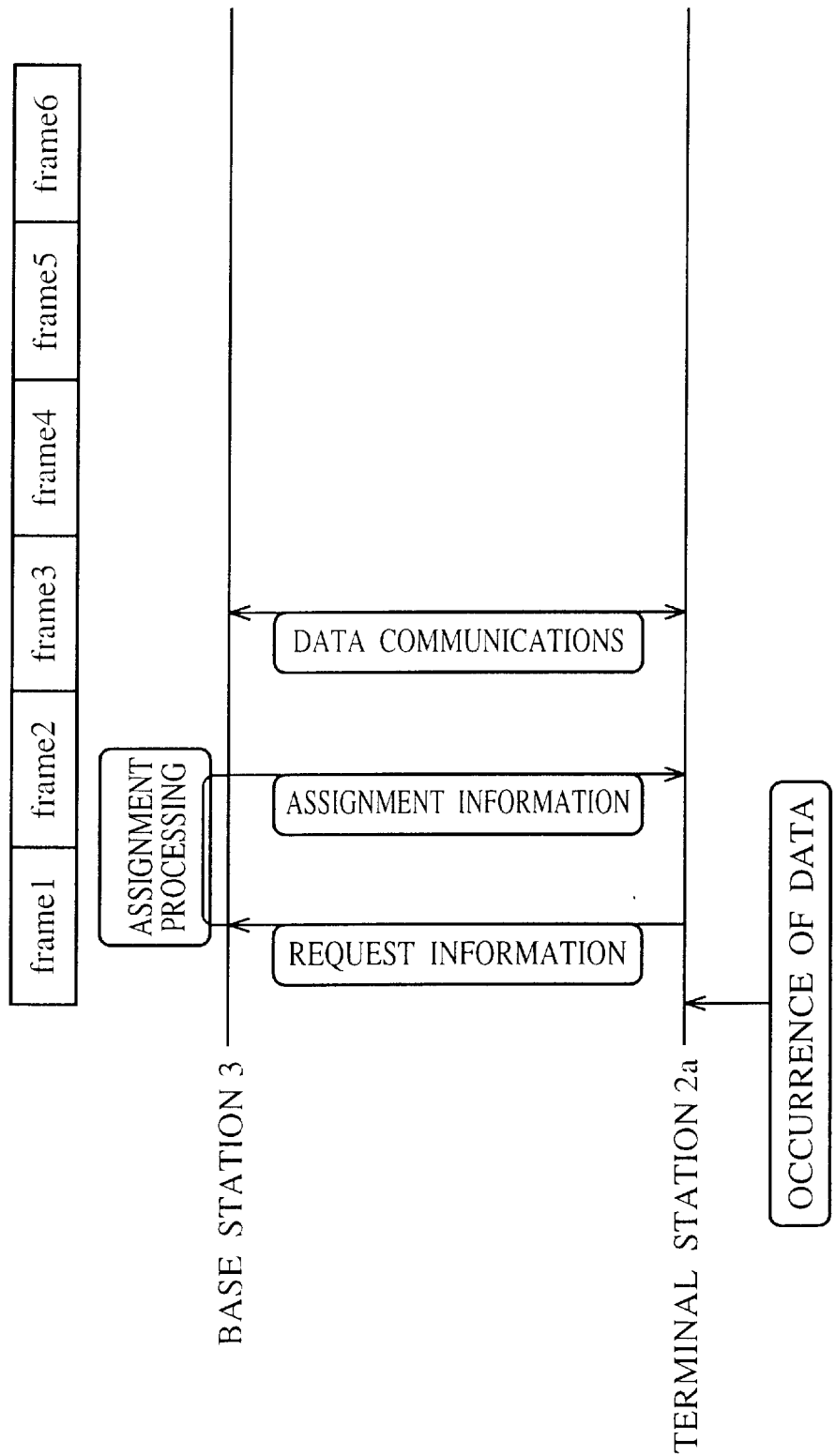
FIG. 9 is a diagram showing the sequence of a channel assignment processing disclosed in Japanese patent application laid-open No. 9-214459/1997.
Figure 10:
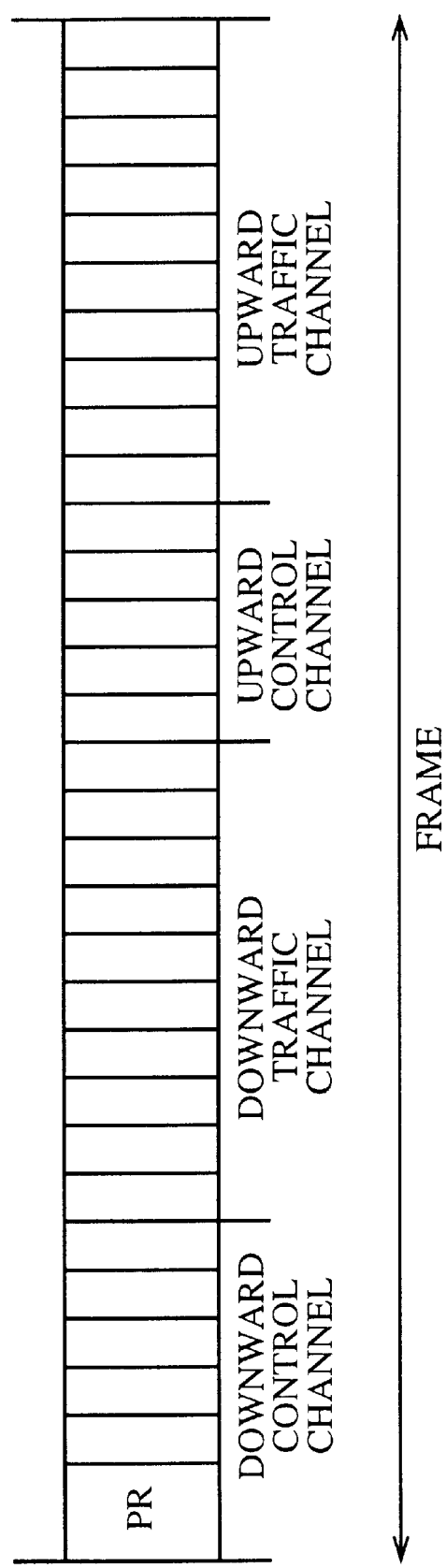
FIG. 10 is a diagram showing the structure of a TDMA frame disclosed in Japanese patent application laid-open No. 10-51406/1998.
Figure 11:
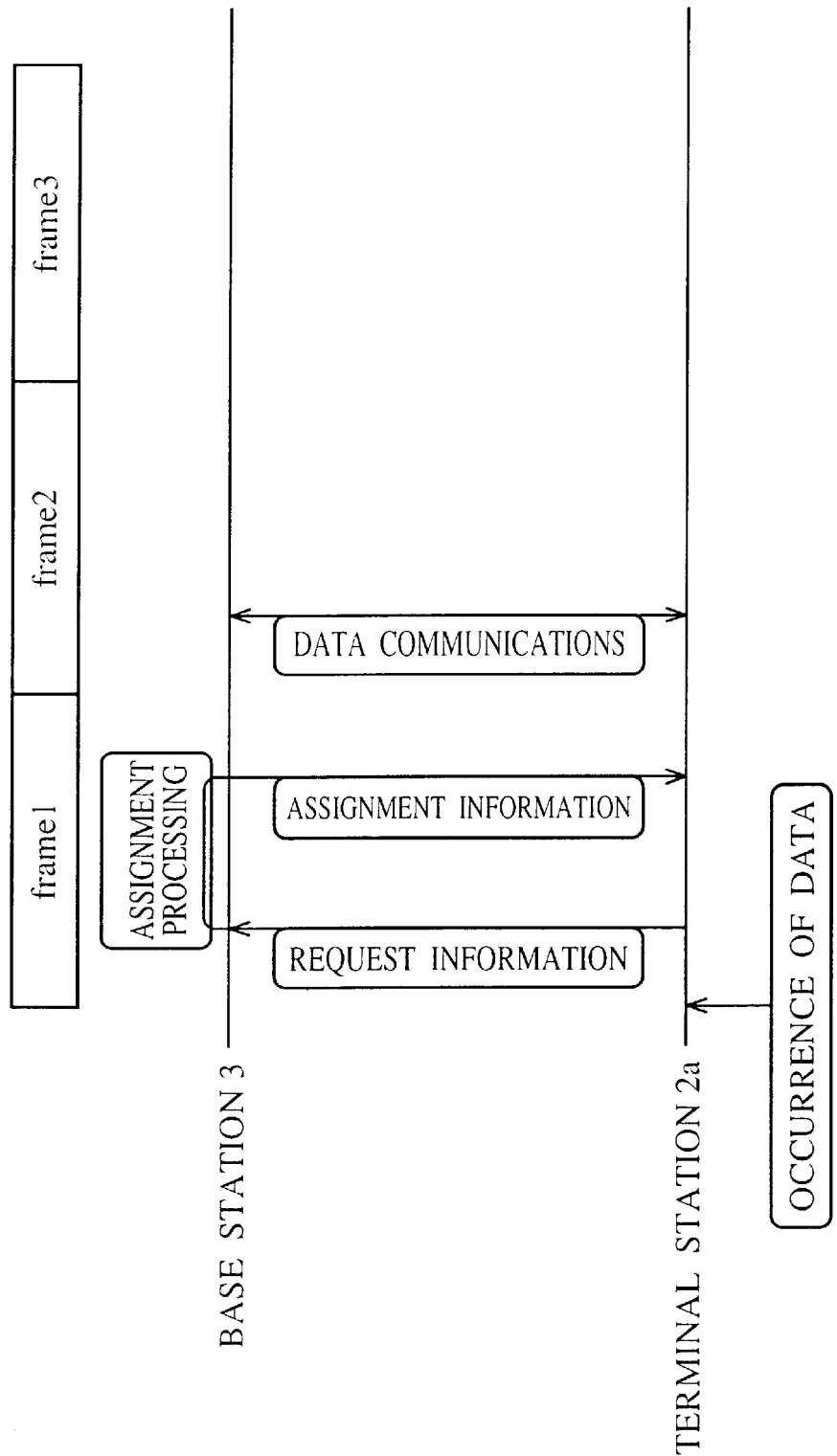
FIG. 11 is a sequence diagram showing a channel assignment processing associated with FIG. 10.

FIG. 7 shows the entire configuration of a TDMA communication system. A base station 3 is connected with terminal stations 2 (2a, 2b and 2c) via radio channels. Terminal units 1 (1a, 1b and 1c) are connected to the terminal stations 2. The base station 3 manages the channel resources between it and the terminal stations 2 connected thereto, and establishes channels between them in response to channel establishment requests from the terminal stations 2. The channel resources are time-divided, and the channel establishment is carried out at a TDMA frame period consisting of a plurality of time slots.

Figure 2:
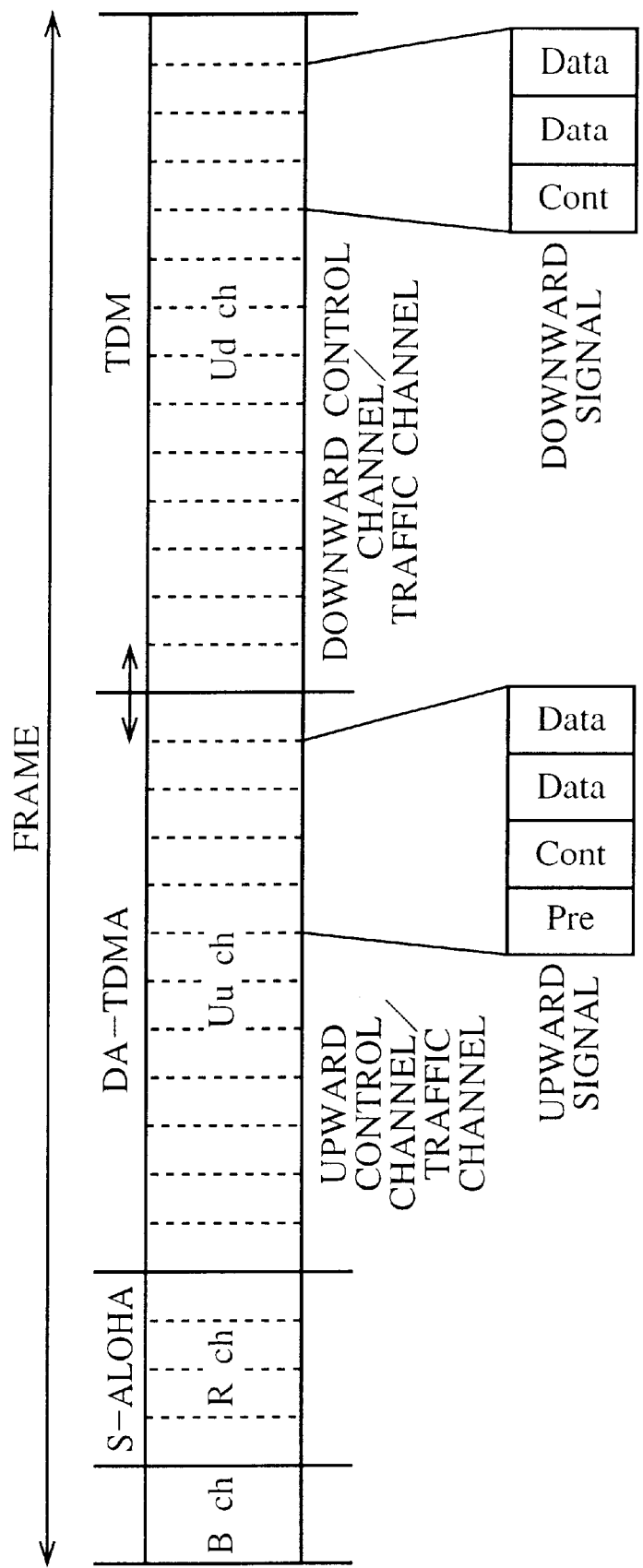
FIG. 2 is a diagram showing a structure of a TDMA frame of the embodiment 1.

FIG. 2 shows a structure of the TDMA frame. Various types of channels are assigned to a plurality of time slots constituting the TDMA frame. In FIG. 2, the reference symbol Bch designates a broadcasting control channel used for sending common information from the base station 3 to the terminal stations 2, and for acquiring frame alignment. The reference symbol Rch designates an access channel used for transmitting from the terminal stations 2 to the base station 3 the assignment request of a user channel. The reference symbol Uuch designates an upward user channel, and Udch designates a downward user channel. The user channels are used for control information transmission and data communications, in which case the communications may be carried out with considering the directivity of an antenna for each user. The upward user channel employs the DA-TDMA as its multiple access scheme, whereas the downward user channel employs the TDM as its multiple access method. An upward signal consists of a preamble, a control channel and a traffic channel, and a downward signal consists of a control channel and a traffic channel. The preamble includes a guard time, synchronizing symbol and the like. The control channel is a logical channel for transmitting signaling information including channel assignment request, channel assignment information and the like, and the traffic channel is a logical channel for transmitting communication data.

Figure 1:
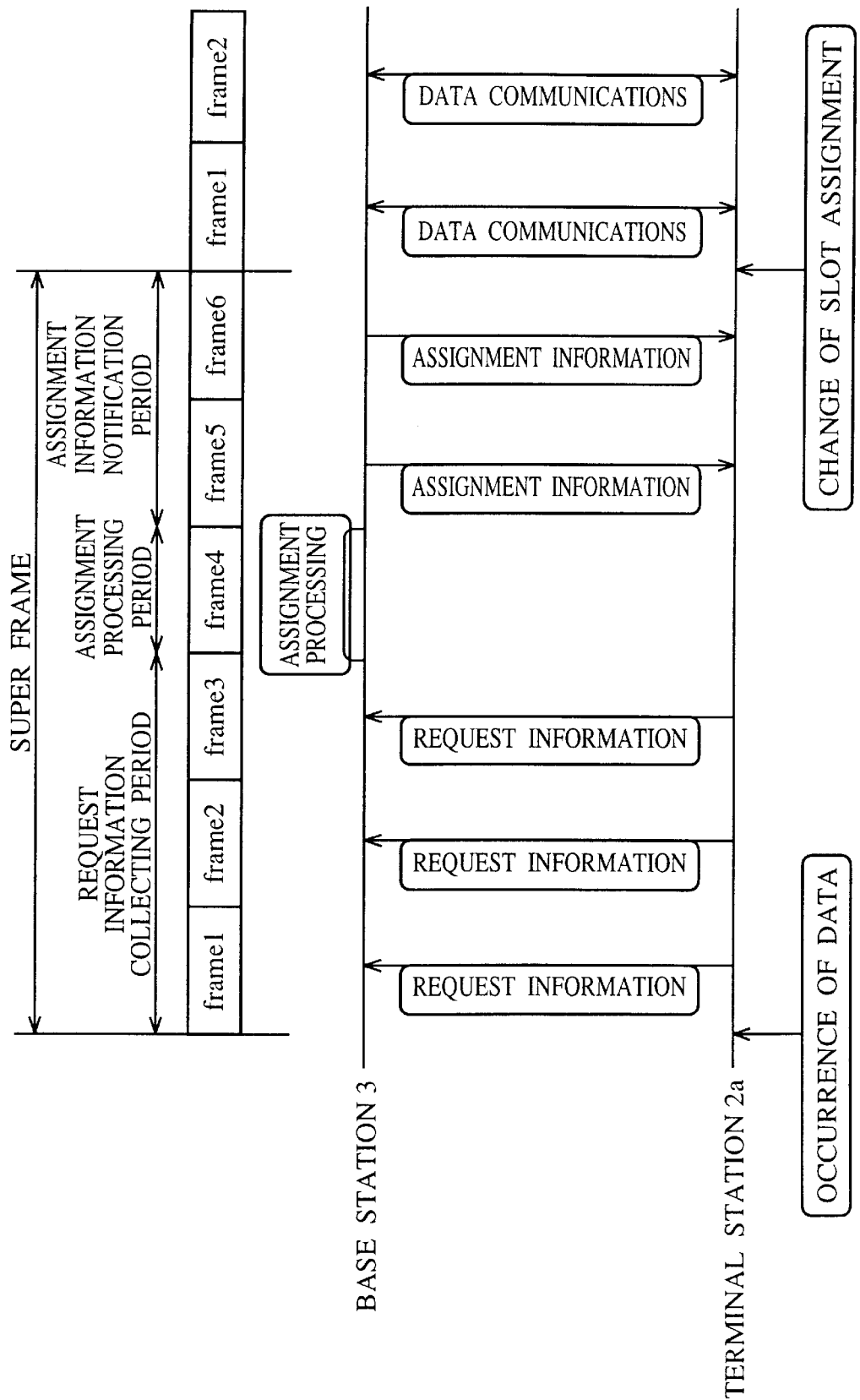
FIG. 1 is a sequence diagram showing a channel assignment processing in an embodiment 1 of a TDMA radio communication method in accordance with the present invention.

FIG. 1 is a sequence diagram illustrating a channel assignment processing of the embodiment 1 in accordance with the present invention. Horizontal axes are a time axis, and the processing is carried out sequentially from the left-hand side. Blocks at the top of this figure represent TDMA frames and a super frame consisting of six frames from frame 1 to frame 6. In the present invention, an assignment information notification period is provided at a latter part of the super frame, and it is preceded by an assignment processing period. The remaining portion of the super frame is assigned as an assignment request information collecting period. In FIG. 1, three frames from frame 1 to frame 3 are assigned to the request information collecting period, the frame 4 is assigned to the channel assignment processing period, and the remaining frames 5 and 6 are assigned to the assignment information notification period.

When data to be transmitted takes place in any of the terminal stations 2, they each transmit to the base station 3 information for requesting assignment of a traffic channel with the number of slots needed for the communications. This transmission is carried out throughout the request information collecting period from frame 1 to frame 3, during which the same information is transmitted repeatedly.

Transmitting the same information many times can improve the transmission reliability in conjunction with the majority decision on the receiving side. This is because the receiving side can receive the information in a kind of time diversity scheme with expecting the statistical independence of transmission characteristics at respective transmission timings. As a result, the base station 3 can collect the assignment request information from the entire terminal stations 2 to which the base station 3 has already assigned the control channel.

The base station 3 carries out the channel assignment processing for the next super frame in the frame 4, that is, in the assignment processing period. Incidentally, the assignment processing period can be omitted if it is unnecessary for the channel assignment processing to have a margin.

First, considering the assignment request information from the entire terminal stations 2 to the base station 3 and the traffic from the base station 3 to the entire terminal stations 2, the base station 3 determines, in accordance with the traffic, the frame structure which depends on the boundary between the upward channel and downward channel and the like. Next, the base station 3 distributes to the terminal stations 2 the slots of the user channel in response to the assignment request information, in which case optimum channel assignment is achieved considering the position information about the terminal stations 2, interference amounts, and priorities of services.

Then, the base station 3 transmits to the terminal stations 2, during the assignment information notification period from frame 5 to frame 6, the frame structure and channel assignment information decided in the assignment processing period. The information about the frame structure can be transmitted through the broadcasting control channel Bch. The same information is transmitted many times to improve the transmission reliability, and hence it becomes possible for the base station 3 to positively send to the entire terminal stations 2 the channel assignment information on the next super frame. Although it is not unlikely that a transmission error takes place in the radio transmission, its adverse effect on the remaining terminal stations 2 is avoidable by taking steps such as inhibiting the transmission of the next super frame from the terminal station 2 that cannot receive the channel assignment information.

As described above, the reliability of the control channel can be improved by setting the request information collecting period and the assignment information notification period over a plurality of frames. This makes it possible to avoid adverse effect of the information transmission error through the control channel on the remaining terminal stations. In addition, providing the assignment processing period can give time for the channel assignment processing. This makes it possible to implement a TDMA communication system capable of simultaneously changing the frame structure and the channel assignment of the entire terminal stations, and to improve the efficiency of the radio channels by using the optimum channel assignment.

Embodiment 2

Figure 3:
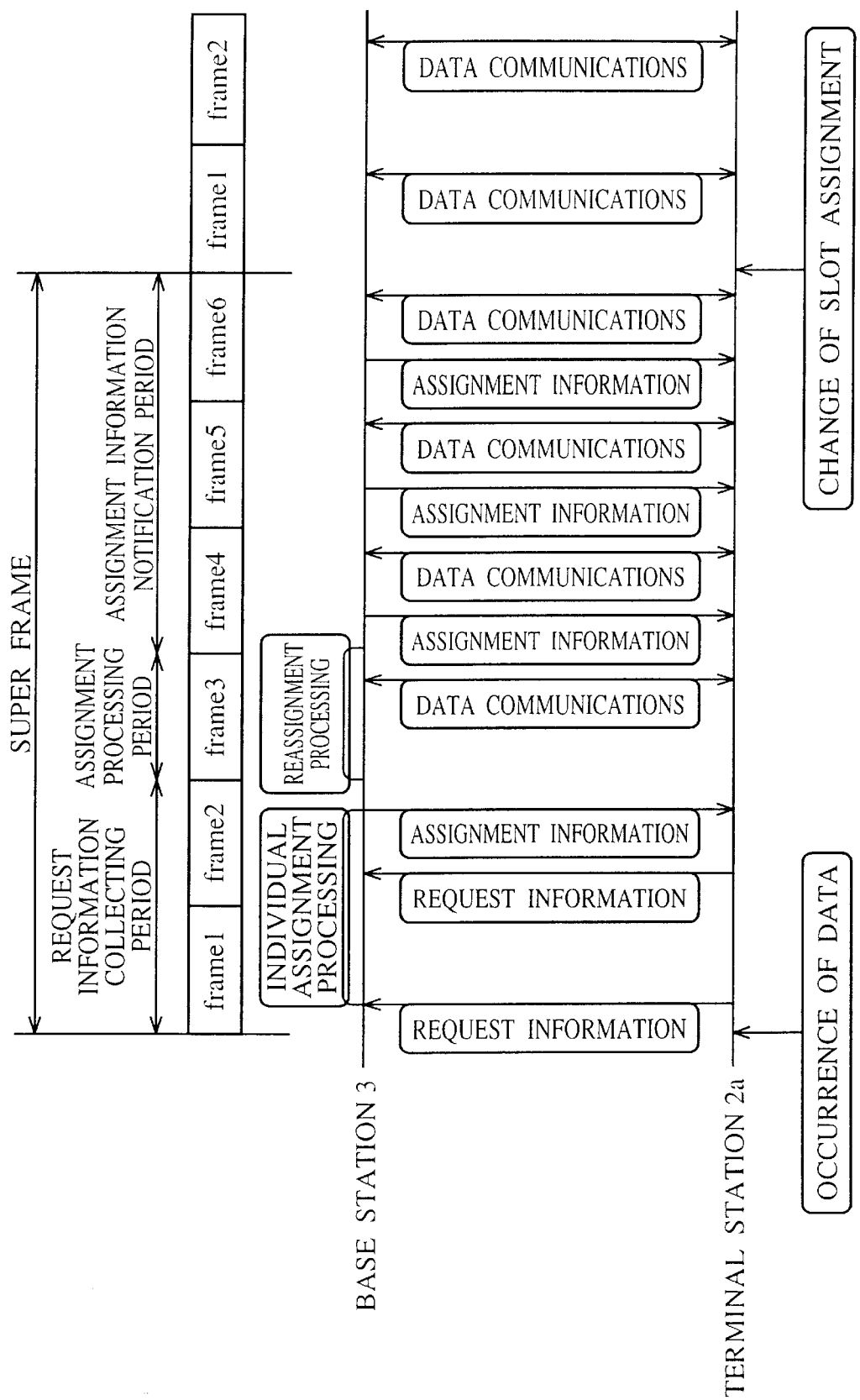
FIG. 3 is a sequence diagram showing a channel assignment processing in an embodiment 2 of the TDMA radio communication method in accordance with the present invention.

FIG. 7 shows the entire configuration of a TDMA communication system, and FIG. 2 shows a structure of the TDMA frame, which are identical to those of the embodiment 1. FIG. 3 is a sequence diagram illustrating a channel assignment processing of an embodiment 2 in accordance with the present invention, in which the base station 3 receives the request information from the terminal stations 2 during the request information collecting period. Horizontal axes are a time axis, and the processings are carried out sequentially from the left-hand side. Blocks at the top of this figure represent TDMA frames and a super frame consisting of six frames from frame 1 to frame 6. In the present invention, the assignment information notification period is provided at a latter part of the super frame, which is preceded by the assignment processing period, and the remaining interval is set as the assignment request collecting period. In FIG. 3, two frames 1 and 2 are assigned to the request information collecting period, frame 3 is assigned to the channel assignment processing period, and the remaining frames 4–6 are assigned to the assignment information notification period.

As in the embodiment 1, the base station 3, considering the request information from the entire terminal stations 2, which is acquired during the request information collecting period, and the traffic from the base station 3 to the entire terminal stations 2, decides in the assignment processing period the frame structure for the next super frame and the channel assignment of the entire terminal stations 2, and sends information about them to the terminal stations 2 during the assignment information notification period. Although the request information from the terminal stations 2 is not reflected until the next super frame in the foregoing embodiment 1, the present embodiment 2 immediately carries out assignment to individual terminal stations, to which no other terminal stations respond.

Figure 4:
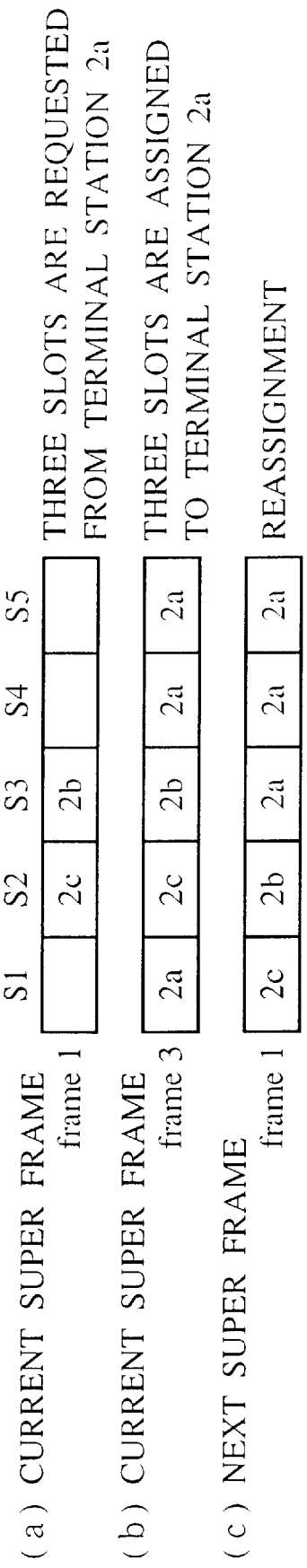
FIG. 4 is a diagram illustrating state transition of the channel assignment of FIG. 3.

FIG. 4 is a diagram illustrating state transitions of the channel assignment, which corresponds to the sequence of FIG. 3. In FIG. 4, respective rows consist of blocks representing slots of an upward user channel, and are disposed from top to bottom in order of time. In this figure, one frame of the upward user channel consists of five slots S1–S5.

In frame 1 of the current super frame, slot S2 is assigned to the terminal station 2c, and slot S3 is assigned to the terminal station 2b. The base station does not carry out the following individual assignment processing until some change takes place in the request information received. In this state, assume that the terminal station 2a sends the assignment request for three slots. The base station 3 selects from vacant slots in the current super frame the requested number of slots, and sends the assignment information to the terminal station 2a. At the time of frame 3 in FIG. 4, slots S1, S4 and S5 are assigned to the terminal station 2a, and data communications using the three slots is started.

In the same frame 3 which is the assignment processing period, the frame structure and the channel assignment for the entire terminal stations 2 is decided. The request information the base station 3 collects during the request information collecting period indicates that the terminal stations 2a, 2b and 2c request three slots, one slot and one slot, respectively. The base station 3, considering the request information from the entire terminal stations 2 and downward traffic, carries out efficient channel assignment. In the case where assignment of continuous slots improves the efficiency, the slots assigned to the terminal stations 2b and 2c are changed to slots S2 and S1, respectively, as shown in the next super frame of FIG. 4, so that the consecutive slots S3–S5 are assigned to the terminal station 2a. The base station 3 notifies the entire terminal stations 2 of the latest assignment information so that it is used from the next super frame.

Figure 5:
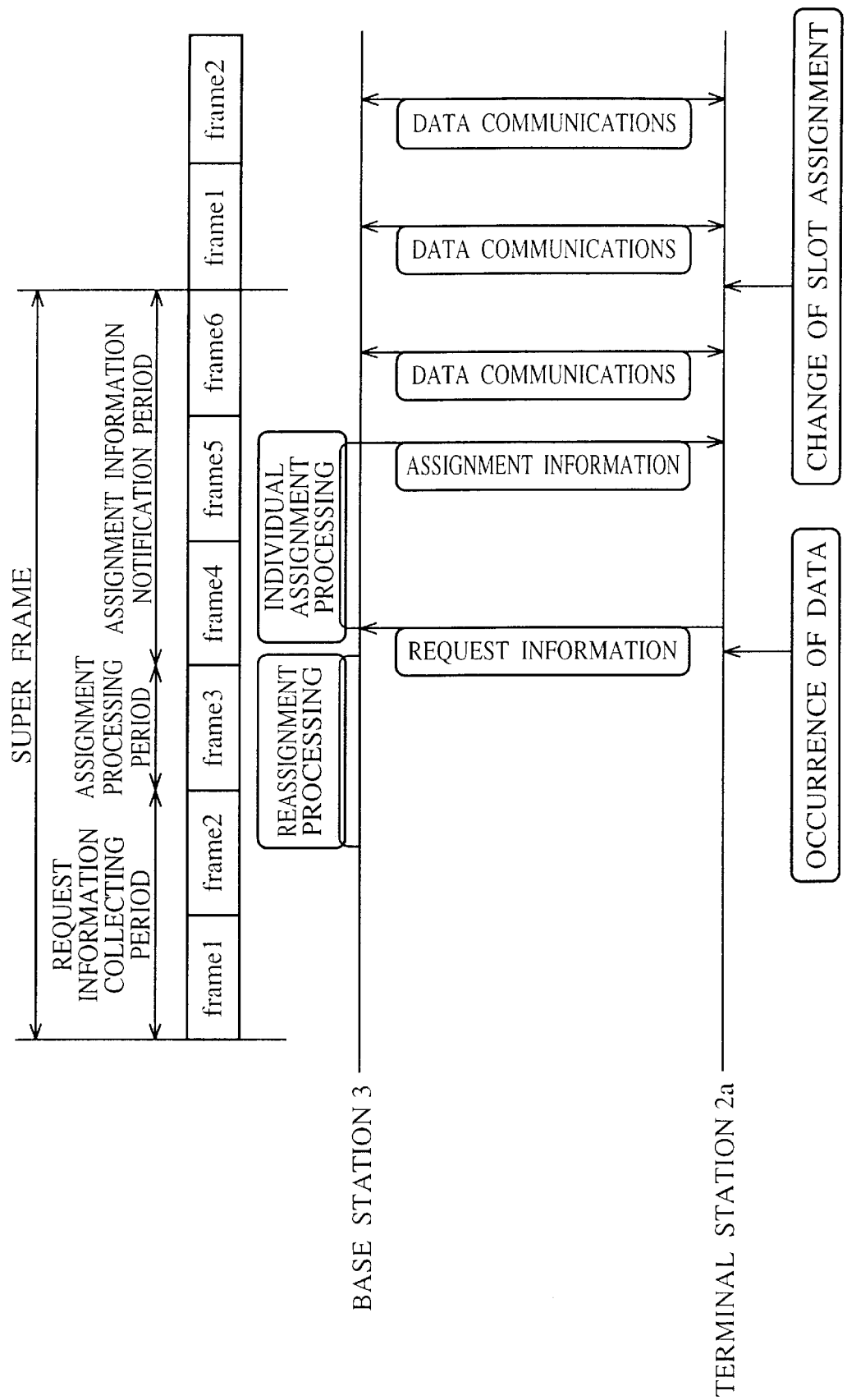
FIG. 5 is a sequence diagram showing another channel assignment processing in the embodiment 2.
Figure 6:
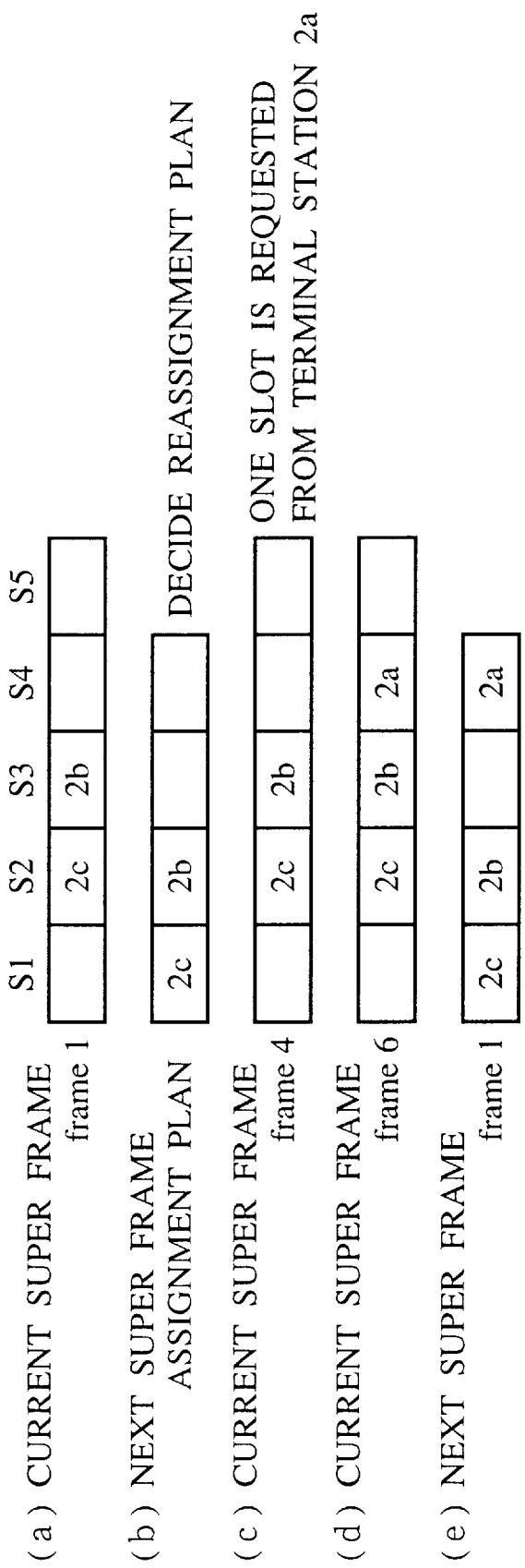
FIG. 6 is a diagram illustrating state transition of the channel assignment of FIG. 5.

FIG. 5 is a sequence chart of another channel assignment processing in the present embodiment 2, in which the base station 3 receives the request information from the terminal station 2a during the assignment processing period or assignment information notification period. FIG. 6 is a diagram illustrating state transitions of the channel assignment, which corresponds to the sequence of FIG. 5. In frame 1 of the current super frame, slot S2 is assigned to the terminal station 2c, and slot S3 is assigned to the terminal station 2b. The frame structure and the channel assignment for the entire terminal stations 2 is decided in frame 3 corresponding to the assignment processing period.

The request information the base station 3 collects during the request information collecting period indicates that the terminal stations 2b and 2c each request one slot. The base station 3, considering the request information from the entire terminal stations 2 and downward traffic, carries out efficient channel assignment. The assignment plan of FIG. 6 indicates that the number of slots of the upward user channel will be changed to four slots. In connection with this, assume that slots to be assigned to the terminal stations 2b and 2c are changed to slots S2 and S1, respectively. The base station 3 notifies during the assignment information notification period the entire terminal stations 2 of the latest assignment information so that it is used from the next super frame.

The base station 3 does not carry out the following individual assignment processing until some change takes place in the request information received. Assume that the terminal station 2a sends a one-slot assignment request in frame 4. The base station 3 selects from vacant slots common to both the current and next super frames the requested number of slots, and sends the assignment information to the terminal station 2a.

In FIG. 6, slot S4 is vacant in both the assignment plan and frame 4, and the data communication using this slot is started. Even if the terminal station 2a cannot receive the assignment information of the next super frame during the assignment information notification period, individually assigning a vacant slot shared by both the current and next super frames can nullify the effect on the remaining terminal stations 2.

As described above, when the base station 3 receives the request information from any of the terminal stations 2 during the request information collecting period, the base station 3 carries out the individual assignment to that terminal station 2 from among vacant slots in the current super frame, whereas when it receives the request information during the assignment processing period or the assignment information notification period, the base station 3 carries out the individual assignment to that terminal station 2 from among vacant slots common to both the current and next super frames. This makes it possible to implement a TDMA radio communication system capable of reducing the time taken to assign channels, which can mitigate the degradation of services due to connection delay and reduce the increase of the buffer capacity for the data communications.

What is claimed is:

1. A TDMA radio communication method which has super frames each consisting of a plurality of frames, and which includes in the frame a control channel for exchanging control information between a base station and at least one terminal station, said TDMA radio communication method comprising the steps of:

providing a latter part of each of the super frames with an assignment information notification period which is preceded by an assignment processing period, and providing a remaining part of the each of the super frame with an assignment request collecting period;

transmitting, from the terminal station to the base station, assignment request information using a plurality of frames included in the assignment request collecting period;

transmitting, from the base station to the terminal station, frame structure information and assignment information over a plurality of frames included in the assignment information notification period; and carrying out, in the base station, channel assignment of a radio channel, changes of the frame structure and of the channel assignment in response to timings of the super frames.

2. The TDMA radio communication method as claimed in claim 1, further comprising the step of transmitting the assignment request information and the assignment information a plurality of times to make a majority decision at a receiving side.

3. The TDMA radio communication method as claimed in claim 1, wherein said frame structure information comprises information on a super frame length and a frame length, and one of two pieces of boundary information consisting of boundary information between an upward channel and a downward channel, and boundary information between protocols of multiple access channels such as a random access channel and a TDMA channel, and wherein said TDMA radio communication method further comprises the step of carrying out optimum channel assignment using said frame structure information.

4. The TDMA radio communication method as claimed in claim 1, further comprising the step of changing the channel assignment to enable the terminal station, to which discontinuous slots are assigned in a current super frame, to use consecutive slots in a next super frame.

5. The TDMA radio communication method as claimed in claim 1, further comprising the step of inhibiting transmission of a next super frame from the terminal station which cannot receive the assignment information during the assignment information notification period, until said terminal station receives the channel assignment information.

6. A TDMA radio communication method which has super frames each consisting of a plurality of frames, and which includes in the frame a control channel for exchanging control information between a base station and at least one terminal station, said TDMA radio communication method comprising the steps of:

providing a latter part of each of the super frames with an assignment information notification period which is preceded by an assignment processing period, and providing a remaining part of the each of the super frame with an assignment request collecting period;

transmitting, from the terminal station to the base station, assignment request information;

carrying out, in the base station, channel assignment from among available slots in a current super frame in response to the assignment request information received by the base station during the assignment request collecting period, and transmitting information on the channel assignment to the terminal station;

carrying out, in the base station, channel assignment from among available slots in both the current super frame and next super frame in response to the assignment request information received by the base station during one of the assignment processing period and the assignment information notification period, and transmitting information on the channel assignment to the terminal station;

transmitting, from the base station to the terminal station, frame structure information and assignment information over a plurality of frames included in the assignment information notification period; and carrying out, in the base station, changes of the frame structure and of the channel assignment in response to timings of the super frames.

7. The TDMA radio communication method as claimed in claim 6, further comprising the step of transmitting the assignment request information and the assignment information a plurality of times to make a majority decision at a receiving side.

8. The TDMA radio communication method as claimed in claim 6, wherein said frame structure information comprises information on a super frame length and a frame length, and one of two pieces of boundary information consisting of boundary information between an upward channel and a downward channel, and boundary information between protocols of multiple access channels such as a random access channel and a TDMA channel, and wherein said TDMA radio communication method further comprises the step of carrying out optimum channel assignment using said frame structure information.

9. The TDMA radio communication method as claimed in claim 6, further comprising the step of changing the channel assignment to enable the terminal station, to which discontinuous slots are assigned in a current super frame, to use consecutive slots in a next super frame.

10. The TDMA radio communication method as claimed in claim 6, further comprising the step of inhibiting transmission of a next super frame from the terminal station which cannot receive the assignment information during the assignment information notification period, until said terminal station receives the channel assignment information.

* * * * *